(12) United States Patent
Cox et al.

(10) Patent No.: US 9,489,168 B2
(45) Date of Patent: Nov. 8, 2016

(54) PROJECTOR FOR DISPLAYING ELECTRONIC MODULE COMPONENTS

(71) Applicant: Lenovo Enterprise Solutions (Singapore) Pte. Ltd., Singapore (SG)

(72) Inventors: Aaron R. Cox, Tucson, AZ (US); Michael A. Curnalia, Tucson, AZ (US); ZhenDe Fu, Shanghai (CN); Lei Li, Shanghai (CN); Christina M. K. Padron, Orlando, FL (US); Leslie Ann G. Velasco, Hercules, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 88 days.

(21) Appl. No.: 14/312,860

(22) Filed: Jun. 24, 2014

(65) Prior Publication Data

US 2015/0370525 A1     Dec. 24, 2015

(51) Int. Cl.
*G06F 3/14* (2006.01)
*G06F 11/20* (2006.01)

(52) U.S. Cl.
CPC .......... *G06F 3/1454* (2013.01); *G06F 11/2069* (2013.01); *G09G 2340/04* (2013.01); *G09G 2340/0464* (2013.01)

(58) Field of Classification Search
CPC ........ G06T 3/40; G06T 19/006; G03B 21/56
USPC ............................................ 345/667; 353/39
See application file for complete search history.

(56) References Cited

U.S. PATENT DOCUMENTS

| 6,919,816 | B2 | 7/2005 | Dearborn et al. |
| 6,964,481 | B2 | 11/2005 | Pho et al. |
| 7,771,057 | B2 | 8/2010 | Combs et al. |
| 8,342,691 | B2 | 1/2013 | Cox et al. |
| 8,388,151 | B2 | 3/2013 | Huebner |
| 9,158,185 | B2 * | 10/2015 | Petrisor ................. G06F 3/017 |
| 2007/0183010 | A1 | 8/2007 | Williams |
| 2008/0061985 | A1 | 3/2008 | Strzelczyk |
| 2008/0178916 | A1 | 7/2008 | Kedjierski |
| 2013/0026220 | A1 * | 1/2013 | Whelihan ........... G06Q 10/087 235/375 |
| 2013/0105557 | A1 | 5/2013 | Spicer et al. |
| 2014/0009893 | A1 * | 1/2014 | Lai ...................... H05K 7/1487 361/728 |

\* cited by examiner

*Primary Examiner* — Zhengxi Liu
*Assistant Examiner* — Yanna Wu
(74) *Attorney, Agent, or Firm* — Zilka-Kotab, PC

(57) ABSTRACT

A system is configured to portray information about at least one electronic module in an enclosure, including at least the positions of components in the electronic module. A projection device has a projection element, a first networking circuit configured to communicate with a server, and a first processor circuit that identifies an electronic module, requests information from a server about at least physical locations of some components in the module, renders an image based on the received information, and scales the image for display on the electronic module. The projection element is configured to display the scaled image on the electronic module after the module is withdrawn from the enclosure.

16 Claims, 5 Drawing Sheets

US 9,489,168 B2

PROJECTOR FOR DISPLAYING ELECTRONIC MODULE COMPONENTS

BACKGROUND

Many different types of electronic devices are mounted, housed and operated in enclosures or rack units. Rack unit enclosures have standardized widths and regularly spaced mounting holes along vertical mounting rails at the sides of the enclosure opening. Electronic modules with housings that fit into enclosures can be mounted on the mounting rails by their faceplates. Electrical and optical connections for power and network communication may be attached to the electronic modules at the front or back of the enclosure.

Some enclosures contain electronic modules that may be withdrawn from the enclosure, such as on a sliding rail, in order to access the inside of an electronic module, such as when replacing a defective part or when increasing the amount of dynamic random access memory in a computer. Indicator lights or small displays on the front of an electronic module may indicate limited amounts of information about the physical components in an electronic module. The present disclosure relates to methods and devices associated with rack-mounted electronic modules. More specifically, the present disclosure relates to systems and methods that may request and display information associated with electronic modules.

SUMMARY

According to embodiments, a system is configured to portray at least information regarding components of electronic modules located at rack positions in an enclosure. The system comprises a projection device having a projection element, a first networking circuit configured to communicate with a server, and a first processor. The first processor is configured to identify an electronic module in the enclosure, request a first set of information about the electronic module via the first networking circuit, the first set of information including at least physical locations of at least some components in the electronic module. The first processor is further configured to render, based on the first set of information, a first image of at least some components of the electronic module and to scale the first image based upon the rack unit position of the electronic module. The projection element is configured to display the scaled first image on the electronic module while the electronic module is withdrawn from the enclosure.

Various embodiments are directed toward identifying a first electronic module from among a plurality of electronic modules in an enclosure and, transmitting an electronic message requesting a first set of information that includes the physical locations of at least some components of the first electronic module. Embodiments are further directed toward receiving the first set of information, rendering, based upon the first set of information, a first image that includes the at least some components of the first electronic module, scaling the first image based upon a first rack position of the first electronic module, and displaying the first image, based upon the scaling and using a projection device, on the first electronic module.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
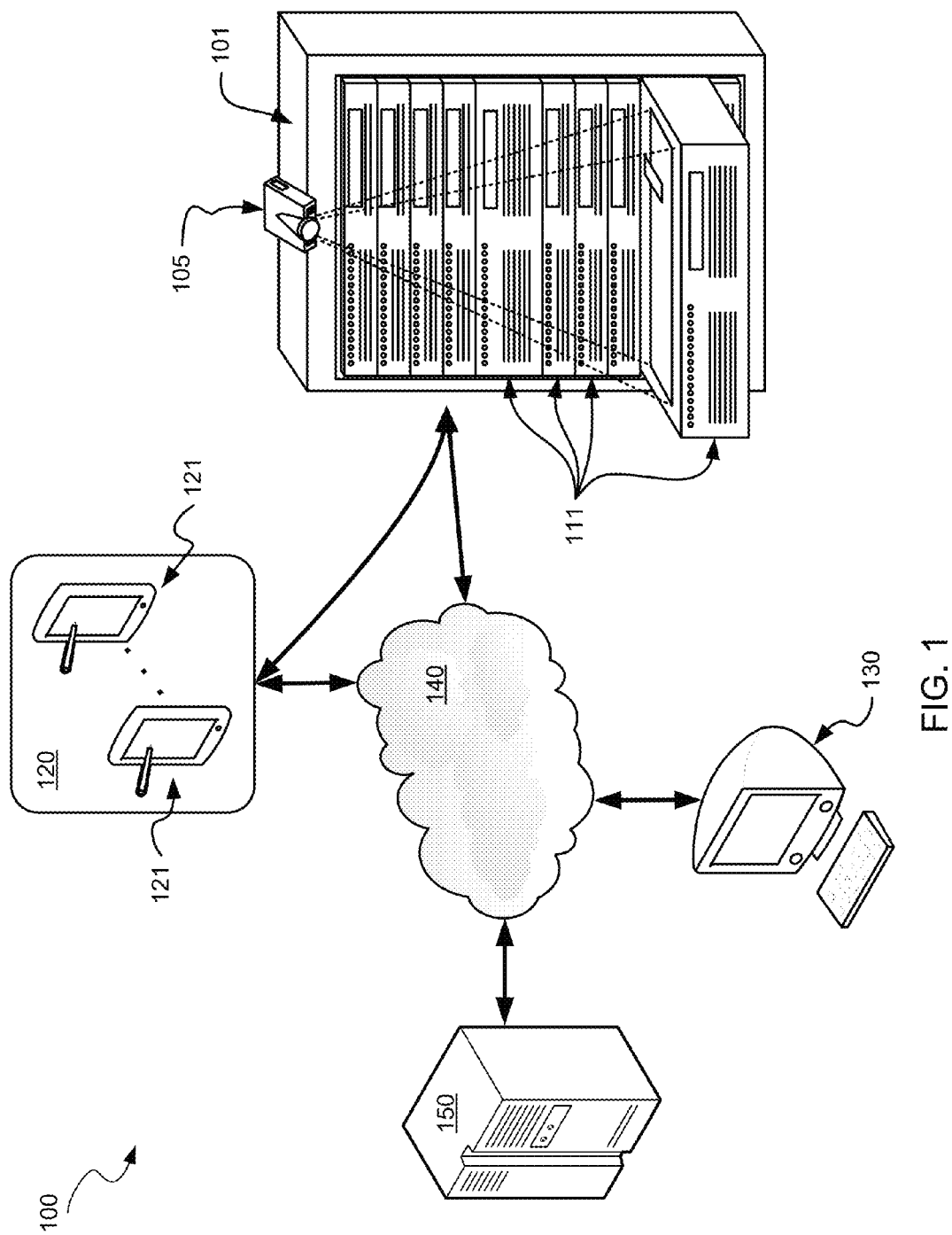
FIG. 1 depicts a computer network that contains an enclosure with multiple electronic modules and a projection device, according to aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to displaying information at or near enclosures that contain electronic modules and electronic components, and more particular aspects relate to projecting an image relating to rack-mounted electronic modules and servers. While the present disclosure is not necessarily limited to such applications, various aspects of the disclosure may be appreciated through a discussion of various examples using this context.

Some aspects of the present disclosure may be directed toward a projection device on an enclosure that may automatically identify an electronic module or computer server in an enclosure when the module is withdrawn from the enclosure for maintenance. Some embodiments of a projection device may display a graphical representation of components within the electronic module directly on the module housing or the module components themselves after withdrawing the module from the enclosure.

Certain aspects of the present disclosure may be directed toward a projection device that displays identifying information about the module components, such as the component's installation date, warranty status, or part number, and may further display information regarding the removal and installation of module components. Some aspects of the present disclosure may describe the use of a portable control device to control the information shown by the projection device. Other aspects of the present disclosure may further describe mirroring or duplicating images for the projection device onto the display of a portable control device held by a user.

When users interact with computer systems or other electronic modules in enclosures, it may be difficult for them to access information about the module. Simple indicator lights may reveal system activity or status such as disk access, network access, disk capacity, or temperature conditions, but do not dispense quantitative or historical information about the module's contents or performance. While such indicator lights may help to identify where (i.e., which enclosure, which module, or which module subsystem) a user needs to focus attention, little additional information can be indicated with simple indicator lights.

Small alphanumeric displays built into the module or server housing might allow greater information display, but can come at the expense of lost space within the module. Further, small displays may require additional time to scroll the information that may be shown on the display in order to find the particular information a user wants to read. Appending larger displays to the sides of individual modules, or to the enclosure itself, in order to increase the amount of display area available may allow for more rapid display of more information to a user interacting with the module. Unfortunately, larger displays may impose significant additional costs to the system and may block airflow needed to cool the rack-mounted modules, requiring additional airflow/cooling to compensate for the display-induced cooling inefficiency. According to some embodiments of the present disclosure, a projection device capable of identifying electronic modules that are pulled from an enclosure may request and receive information about at least the physical components of withdrawn electronic modules and display that information onto the top sides of the electronic modules without impeding cooling airflow through enclosures with rack-mounted modules.

FIG. 1 shows a system 100 made up of various electronic devices that can communicate with each other using, but not necessarily limited to, systems that include the global Internet, wide area networks (WAN), local area networks (LANs), public networks, private networks and combinations thereof. Computer systems discussed herein, including system 100, can include one or more computer processor circuits that are each configured to include various modules and perform the specific functions described in the present disclosure. The network contains several electronic modules 111 mounted in an enclosure 101. The network also includes a projection device 105 in the enclosure 101, the projection device being oriented to display images on the electronic modules in the enclosure when they are moved from a recessed position into a withdrawn position. The network 100 may also include desktop computers 130, servers 150, and a plurality of portable control devices 120, where each portable control device 121 can communicate with the projection device 105 by a contactless point to point communication method such as infrared data transmission, e.g., the Bluetooth® Core Specification 4.1, Adopted on 3 Dec. 2013, or the Near Field Communication (NFC) protocol. A portable control device 121 may also communicate with the projection device 105 by means of a network connection that may be routed through network infrastructure 140 such as routers, gateways, switches and servers in order to transmit information between the projection device 105 and portable control device 121.

Projection device 105 may also be connected to electronic modules 111 in the enclosure 101 and may be able to communicate with them in order to request and to display information about the identity, installation date, and performance of the electronic module's subsystems such as central processing unit (CPU) type and location, present and historical CPU load levels and temperature, cooling fan location and activity, positions of individual sticks of computer memory in the electronic module, the capacity of each stick of computer memory, locations of hard disk or solid state storage components in the electronic module, and location and type of networking components. Projection device 105 may have this information already stored inside the projection device, it may request it from an electronic module that is being withdrawn from the enclosure after electronic module identification, or it may request the information from a remote computer on the network.

Aspects of the present disclosure may teach using a projection device in conjunction with performing repairs or upgrades to an electronic module in an enclosure. For example, a computer server mounted in an enclosure may experience an error such as a fan failure or a hard disk failure. The enclosed server may transmit an error message to an email server that, in turn, transmits an electronic message to a technician or administrator that is charged with performing service or repairs on the electronic module. Upon receiving the electronic message, the technician may then approach the enclosure with the server and pull it out of the enclosure opening without detaching the power leads or communication cables that may be attached to the back of the server.

A projection device may be attached to the front or top of the enclosure and oriented to direct its light source and lens array toward the top surface of the server. When the server is pulled out of the enclosure, a sensor may detect the withdrawal and initiate several processes. The projection device may first identify the server that has been withdrawn from the enclosure. This module identification process may be accomplished by reading a barcode or other visual datum on the top side of the server housing, or by the projection device sensor measuring the distance between the projection device and the withdrawn server. The projection device may then use the distance measurement, barcode or visual datum to create an electronic message requesting information about the server. The electronic message may be transmitted internally to a hard drive or other storage medium, or it may be transmitted to a remote server, to a computing device in the enclosure, or to the withdrawn server itself.

Upon receiving the server information, the projection device may render an image showing, for example, the locations of the physical components in the server housing and further displaying identifying information such as manufacturer name, model number, capacity (i.e., for hard disks, memory, or storage media), and then project the image onto the server housing or onto the server components themselves. In some embodiments, the projection device may be able to indicate whether a particular component has experienced an error or failure by using a different color in the projection for normal and "errored" components, or by making the "errored" component appear to flash in the projection.

Figure 2:
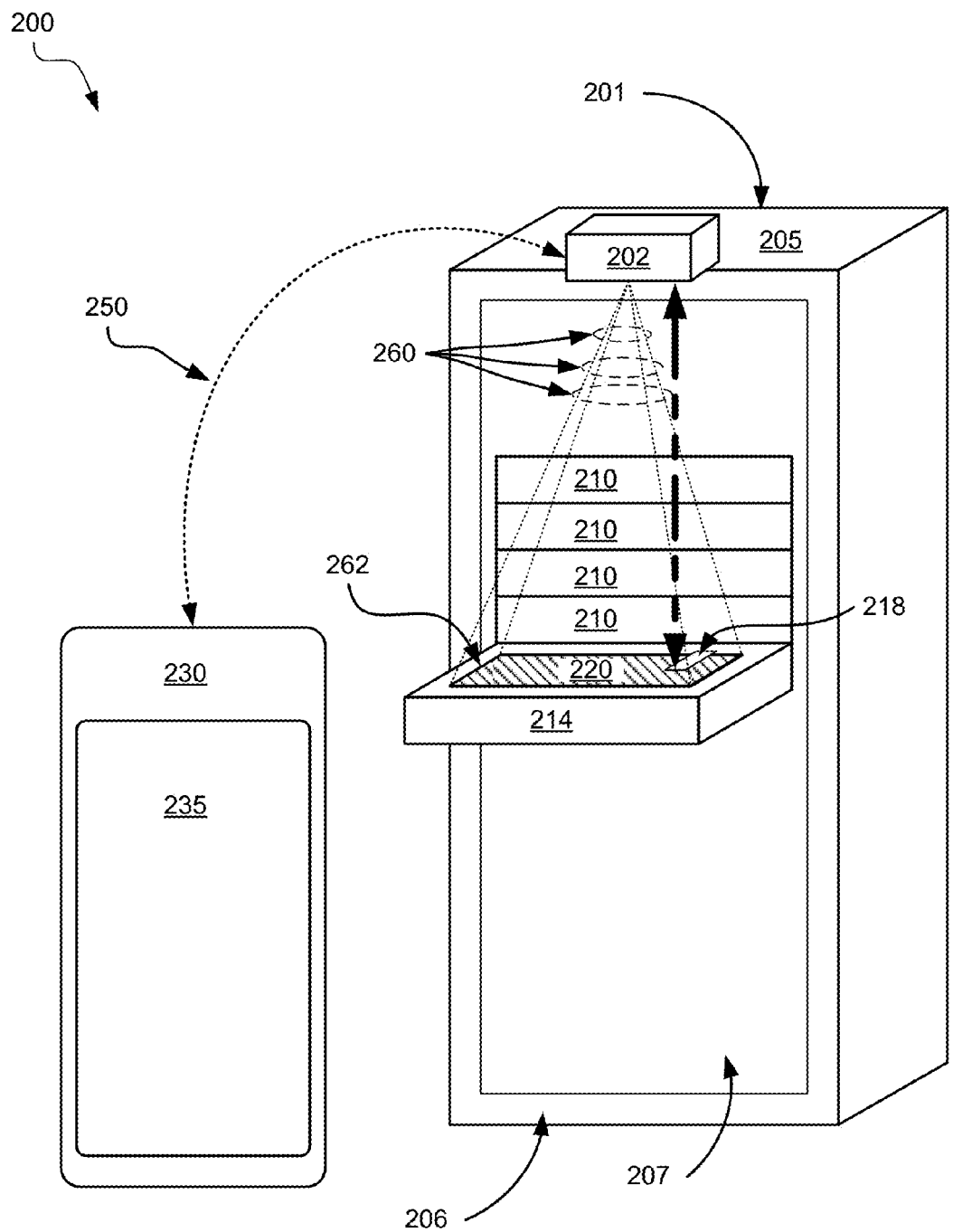
FIG. 2 shows an embodiment of an enclosure containing multiple electronic modules and a projection device with a control device that can interact with the projection device.

FIG. 2 shows a more detailed view of a connected set 200 of a portable control device 230 and an electronic module 214 in an enclosure 201. The connected set 200 may be part of a heterogeneous network such as that described in FIG. 1, or may be made up of a network that includes a less diverse set of electronic modules in one or more enclosures. The enclosure may have a top side 205 with a projection device 202 in close proximity. The projection device 202 may be fastened to the top side 205 by a mechanical fastener, by a physical clip, or by a magnetic fastening system according to aspects of the present disclosure. In some embodiments, the projection device may be fastened to the front side 207 of the enclosure 201 by similar means, or may be inserted into an opening within the enclosure front side 206 to hold it in place. The projection device may be communicatively connected to a first electronic module 214 in a withdrawn position, as well as to each other electronic module 210 that may be in a recessed position in the enclosure 201 in order to send requests and receive data from them regarding their status and physical components.

Projection device 202 may include one or more sensors that can be configured to identify individual electronic modules upon withdrawal from the module from the enclosure 201. When a first electronic module is withdrawn from the enclosure through the front opening 207, the projection device may use a first sensor to identify which electronic module has been withdrawn. The module identification process may include measuring a distance between the projection device and the electronic module being withdrawn from the enclosure, or it may include the interpretation of a visual datum 218 on the electronic module, which may include various types of barcodes or other characters using image processing or optical character recognition. The visual datum 218 may be an identifying mark such as a string of characters or a one- or two-dimensional barcode that can be photographed or scanned and processed to identify the electronic module to which the visual datum is attached.

The projection device 202 may then perform a component identification process, where the projection device 202 either looks up a list of components in the first electronic module 214 in a storage medium in the projection device, or the projection device 202 may request the component information from the first electronic module 214 or from another device, such as the remote server 150 from FIG. 1.

Upon receiving the component information for the first electronic module 214, the projection device 202 may then render an image that shows the component information, which may include such data as the positional information, part numbers, warranty status, purchase price, and original installation date for components, and project that image through a projection field 260 between the projection device 202 and an image field 220 on the top side of the first electronic module 262. The size of the image displayed on the top side of the first electronic module 262 may be scaled in order to fit and proportionally display the information rendered by the projection device. For example, some embodiments of projection devices 202 may vary the size of the projection field 260 between the projection device 202 and the top side of the first electronic module 262, where the solid angle of the projection field 260 may be smaller for electronic modules that are more distant from the projection device 202. In other embodiments, the size of the projection field 260 may be fixed and the image size may be enlarged or shrunk within the projection field 260 in order to align the projected image with the contents of the first electronic module 214.

According to some embodiments of the present disclosure, a portable control device 230 may be connected 250 to the projection device 202 using contactless point-to-point protocols or more common device networking protocols such as those described in FIG. 1. The portable control device 230 may have a control device display 235 that can receive the image rendered by the projection device and display that image on the control device display 235. Displaying an image on a control device display 235 may be appropriate when the distance between the projection device 202 and the first electronic module 214 is very small, making it difficult for the projection device to scale the image to cover the entire top side of the first electronic module 262, or when it may be difficult for a user to view the image displayed on the top of a first electronic module 214, especially when the first electronic module may be in the upper portion of an enclosure 201.

Figure 3:
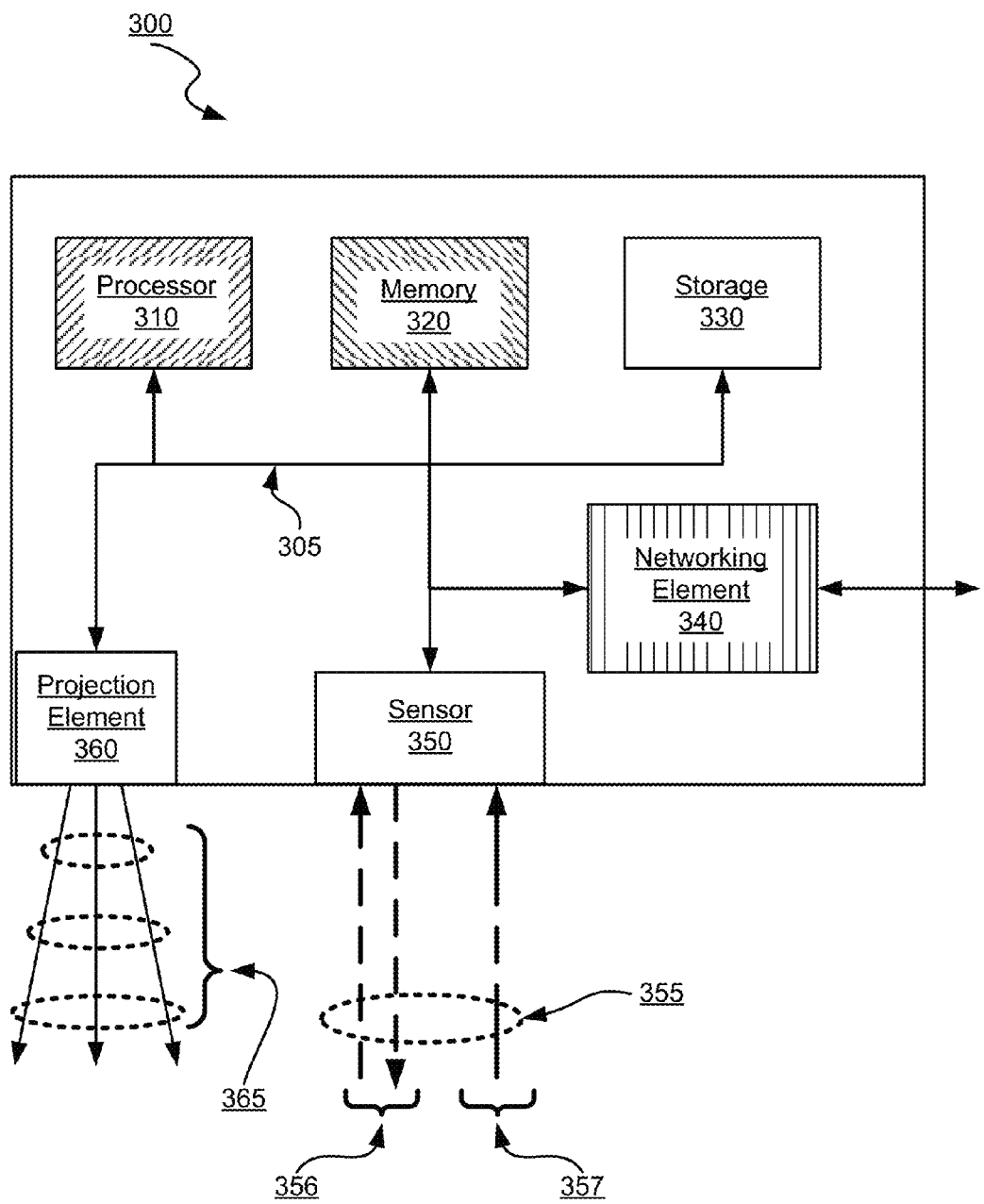
FIG. 3 portrays a projection device that can identify an electronic module in an enclosure and display information on the electronic module, according to aspects of the present disclosure.

FIG. 3 shows an embodiment of a projection device 300 that may be used to display information about an electronic module mounted in an enclosure onto the electronic module when it is withdrawn from the enclosure. The projection device 300 may include a processor 310, a memory 320, storage media 330, a first networking component 340, a first sensor 350, and a projection element 360, all connected to each other by a data bus 305. The projection element 360 may have an associated projection field 365 created as it emits light to display an image, where the projection field 365 may be a fixed size, or may have a variable size according to aspects of the present disclosure.

The first sensor 350 may be an active sensor that emits light or sound and receives a signal in return (such as a pattern of reflected light or sound). The sensor may also be a passive sensor that interprets, for example, a picture of the top of an electronic module, looking for an identifying mark, or an electrical signal from a mechanical switch in an enclosure holding electronic modules that opens when a module is withdrawn from the enclosure. Examples of active sensors may include barcode scanners, ultrasonic position-sensing units, and pulsed optical systems that emit light such as a laser beam and time the reflection of the emitted light's return to the sensor. Passive sensors may include cameras that can analyze pictures to look for identifying marks (one- or two-dimensional barcodes or text strings such as a serial number or other identifying mark). The module identification process may be triggered by the opening of a mechanical switch that transmits an electrical signal to the sensor in some embodiments. In other embodiments, passive sensors may periodically or continuously monitor sensor input, and active sensors may periodically or continuously emit sound or light and determine whether a signal has been received, in order to detect when an electronic module has been withdrawn and to initiate the module identification process.

Upon detecting that an electronic module has been withdrawn from the enclosure, the first sensor 350 may signal to the processor 310 that the withdrawal event has occurred and identify the first electronic module. The module identification process may be direct, such as when the sensor recognizes the module identity by a module identifier mark on the module housing, or indirect, such as when the sensor identifies the rack unit position of the first electronic module and the processor must correlate the rack unit position with a module identity. The module identity may be stored and identified by the processor accessing memory 320 or storage media 330 in the projection device 300 or by sending an electronic message via the first networking component 340 to another computer that can identify the particular electronic module that has been withdrawn from the enclosure.

When the processor 310 receives the module identity, it may then begin identifying the components of the first electronic module. The component identification process may consist of sending a request to the projection device memory 320 or storage media 330, or sending an electronic message to the first electronic module or another computer, to return a first set of information to the processor that contains at least the components of the first electronic module. The first set of information may include additional information such as performance logs for various components (e.g., processor temperature, processor loads, memory usage, memory error history and status, network performance, etc. . . . ), and information regarding removal and replacement of various components.

Aspects of the present disclosure may include a projection device 300 with at least two networking components. The first networking component may be configured to create indirect connections between the projection device 300 and the first electronic module withdrawn from the enclosure, or between the projection device 300 and a portable control unit via a combination of wired and wireless network infrastructure. A second networking component may be configured to create and to maintain a direct, contactless peer-to-peer connection between the projection device using point-to-point protocols such as those described in the discussion of FIG. 1.

Figure 4:
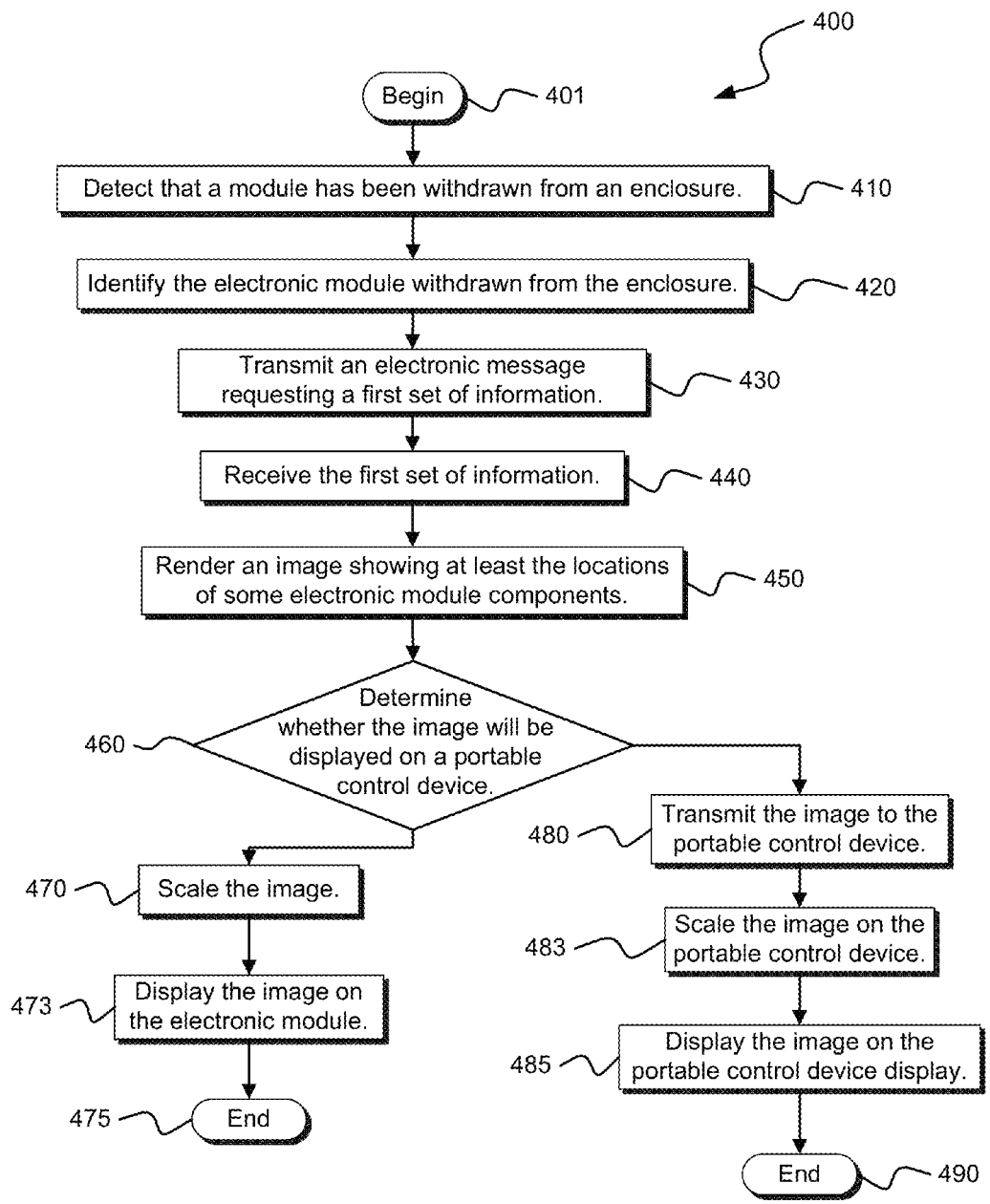
FIG. 4 describes a method of using a projection device to display information about an electronic module on the electronic module or on a control device display, according to aspects of the present disclosure.

FIG. 4 describes a method 400 that may be used to project information about an electronic module onto the electronic module when it has been withdrawn from an enclosure, or to display the information on a portable control device display, according to some embodiments. The method begins in block 401. First, the projection device detects that a first electronic module has been withdrawn from an enclosure, as shown in block 410. Next, the projection device identifies the first electronic module from among a plurality of electronic modules located in the enclosure, as shown in block 420. The identification of the first electronic module may be accomplished by using a passive sensor that, for example, takes pictures and performs image processing such as optical character recognition to determine the identity of the first electronic module. Or, in other embodiments, the module identification process may begin with an active sensor that emits a pulse of sound or light to identify the first electronic module by measuring a distance to first rack unit position or to recognize an identifying mark on the electronic module such as a barcode.

The projection device may then transmit an electronic message to request a first set of information about the first electronic module, including at least information about the locations of at least some components of the first electronic module, as shown in block 430. The projection device may then receive the first set of information, as described in block 440.

Having received the first set of information, the projection device may then render an image showing at least the locations of some of the components of the electronic module, as shown in block 450. The projection device may then determine whether the rendered image is to be displayed by the projection device or by a portable control device that is communicatively connected to the projection device, as shown in block 460. Upon determining that the image should be displayed by the projection device, the projection device may then scale the image, as shown in block 470, and display the image on the top side of the first electronic module, as shown in block 473. This branch of the method ends in block 475.

Upon determining that the image is to be displayed by the portable control device, the projection device transfers the image to the portable control device, as shown in block 480. The portable control device then scales the image to fit on the portable display device display, as shown in block 483. The portable control device then displays the image on the portable control device display, as described in block 485. This branch of the method ends in block 490.

Some aspects of the present disclosure may teach similar methods, where the step of determining where the image is to be displayed is earlier or later in the method. For example, the determining step may occur before requesting the first set of information, and the information may then be routed to the device that will display it prior to rendering a second image generated from the first set of information. In other embodiments, the first set of information may be received by the projection device prior to the determining step, and then retransmitted to a portable control device prior to rendering a second image on either the projection device or the portable control device.

Figure 5:
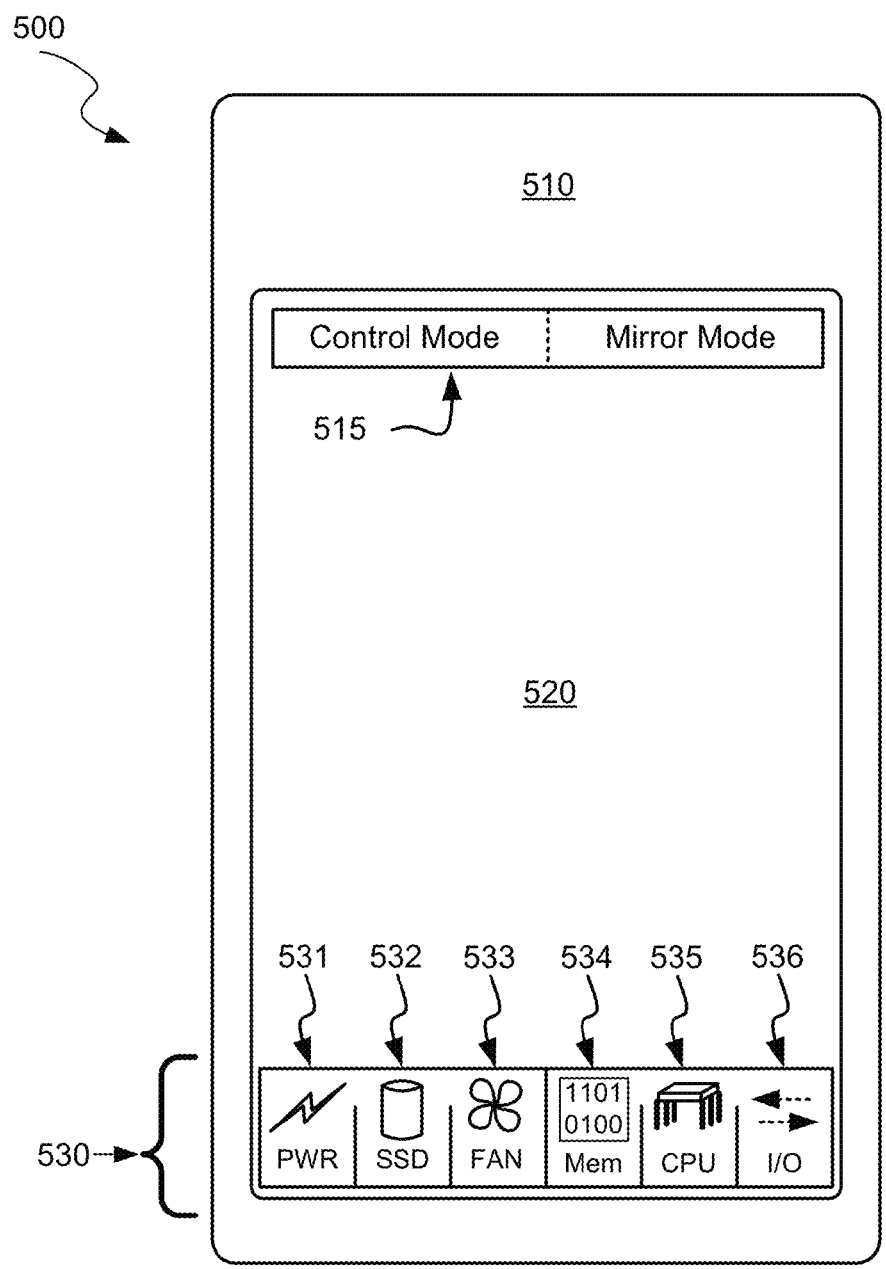
FIG. 5 is representative of embodiments of a portable control device 500 with a display configured to assist in selecting and displaying information about an electronic module, according to aspects of the present disclosure.

FIG. 5 shows one embodiment 500 of a portable control device that may be used to control a projection device, according to aspects of the present disclosure. A portable control device may have a networking component that is configured to communicate with the projection device and a second processor circuit that can request and manipulate data. The second processor may request the first set of information from the processing device, render a second image based on the first set of information, and display the second image on the control device display. In some embodiments, a first image may be rendered on the projection device and a second image rendered on the portable control device regardless of the outcome of the determining step, even though only one image may be displayed for a user.

Aspects of the present disclosure may teach several types of portable control devices that may be used to interact with a projection device. Some embodiments of portable control devices may be hardwired control devices with fixed-function buttons that can initiate data requests and displays of various sets of information about an electronic module in an enclosure. Such information may include descriptive information about components of the electronic module as well as information about power consumption, cooling, drive or storage media capacity and function, memory errors, memory capacity presently available, processor temperature, processor load, network performance, and so forth. Other embodiments of portable control devices may include general-purpose or laptop computers with keyboards with some form of wireless (e.g., WiFi®) network connectivity or contactless point-to-point communication technology such as described in FIG. 1. Other embodiments of portable control devices may include tablet computers or handheld computers dedicated to projection device interaction or running specialized software configured to interact with projection devices.

Portable control devices may have a body 510 and a portable control device display 525. The portable control device may be configured to receive notifications from electronic modules, servers, or other computers on networks similar to those previously described in FIG. 1. Some embodiments of portable control devices may contain a second sensor similar to the sensors in projection devices as described in FIG. 3, and may use the second sensor upon the occurrence of a sensor trigger (button depression, hyperlink or icon selection) to initiate the module identification process and the component identification process described above in FIG. 2. A portable control device may be used to complement the information display processes performed by a projection device associated with an electronic module in an enclosure. Some embodiments of portable control devices may request a first set of information from a projection device after the projection device has received the first set of information about an electronic module, and then render and scale a second image based on the first set of information, independent of any image rendered and scaled by the projection device. Some embodiments of the portable control device may independently send electronic messages requesting a second set of information about an electronic module before any image is rendered and scaled by either the projection device or the portable controller. Other embodiments of the portable control device may receive a first set of information about an electronic module, render and scale an image based on that first set of information, and then in response to a control action such as depressing a controller button or selecting an icon on a display, request a second set of information via electronic message, receive a second set of information, and based upon that information render and scale a third image and display that image on the control device display.

According to aspects of the present disclosure, embodiments of portable control devices may be operated in different operational modes: a control mode and a mirror mode that may be selected from a mode selection region on the portable control device display 520. The mirror mode may cause a portable control device to display an image originating on a projection device onto the portable control device display 520. A mirror mode of operating a portable control device may be helpful when an electronic module is in a position that a user cannot see the image projected onto it from a comfortable vantage point. Mirror mode may also be useful for a user of a portable control device communicatively connected to a projection device over a network to inspect or inventory electronic module components or installed software at a distance without having to physically approach and interact with the electronic module at the enclosure.

A portable control device running in a control operational mode may request information independently of the projection device and may render and scale images based on the independently received information. According to the specific control mode software used in embodiments of portable control devices, some control modes may have a plurality of selection icons 530 that may include specialized screen regions (buttons, icons, or hyperlinks) that can request, scale and display information regarding electronic module power 531, storage media 532, fan and cooling 533, memory 534, processor 535, and networking subsystems 536. Other screen icons may be directed toward software versions, component installation dates, component failure frequency, and so forth.

The information requested and displayed by a projection device or a portable control device may, in certain embodiments, be dynamically updated to reflect present status of a physical component in an electronic module. Other embodiments of the present disclosure may permit a user to request and to view, whether on the module or on the control device display, historical information about component performance and how that information compares to safety limits or statistical trends of a plurality of similar components in other electronic modules. The information displayed may be presented in a graphical format, such as when showing the locations of components in an electronic module, or may be displayed using text or transmitted to a user by a speaker, such as when converting text to spoken language using a computing device or specialized software. The information displayed may consist of text and log files, graphical plots of statistical or historical performance data, maintenance instructions, installation instructions, diagnostic instructions, and sound recordings and pre-recorded video clips about these types of information.

Referring to the projection device and portable control device described in FIGS. 1 through 5, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system configured to portray components of a plurality of electronic modules located in respective rack unit positions of an enclosure, comprising:
   a first processor configured to:
   identify a first electronic module of the plurality of electronic modules;
   request a first set of information that includes physical locations of a plurality of components of the first electronic module;
   render, based on the first set of information, a first image of the plurality of components of the first electronic module, where the first image includes a graphical indication of a location of each of the plurality of components within the first electronic module along with identifying information for each of the plurality of components;
   scale the first image based upon a first rack unit position of the first electronic module; and
   enable a display of the scaled first image, such that the graphical indication of the location of each of the plurality of components and the identifying information is aligned with and projected directly onto each of the respective plurality of components located within a housing of the first electronic module while the electronic module is withdrawn from the enclosure.

2. The system of claim 1, wherein the first processor is further configured to send the first set of information to a second processor circuit to enable a rendering of
   a second image based on the at least some of the components of the first electronic module and a display of the second image on a portable control device display.

3. The system of claim 1, wherein the first processor is further configured to receive a detection of whether an electronic module has been withdrawn from the enclosure.

4. The system of claim 1, wherein the first processor is further configured to receive a detection of a withdrawal of the first electronic module and identify the first electronic module in response to the detection of the withdraw.

5. The system of claim 1, wherein the first processor is further configured to receive a visual datum recognized on the electronic module.

6. The system of claim 1, wherein the first processor is further configured to receive a measurement of a distance between a projection device and the electronic module.

7. The system of claim 1, wherein a portion of the scaled first image displayed on first electronic module indicates at least one of an error and a failure of a particular component of the first electronic module.

8. The system of claim 7, wherein the portion of the scaled first image indicates the at least one of an error and a failure of the particular component of the first electronic module by projecting the particular component with a different color.

9. The system of claim 7, wherein the portion of the scaled first image indicates the at least one of an error and a failure of the particular component of the first electronic module by flashing a projection on the particular component.

10. The system of claim 1, wherein the first processor is further configured to:
    receive a selection of a mirror operational mode from a portable device separate from the enclosure;
    send the first image to the portable device for display on the portable device;
    receive a request for historical information for one or more of the plurality of components within the first electronic module, as well as a comparison of the historical information to statistical trends for a plurality of additional components in additional electronic modules; and send the historical information and comparison to the portable device to be displayed when showing the graphical indication of the location of each of the plurality of components.

11. The system of claim 1, wherein the first image is scaled in order to align the first image with the plurality of components located within the housing of the first electronic module.

12. A method of portraying components of a plurality of electronic modules located in respective rack unit positions of an enclosure, the method comprising:
- identifying a first electronic module of a plurality of electronic modules;
- requesting a first set of information that includes physical locations of a plurality of components of the first electronic module;
- rendering, based on the first set of information, a first image of the plurality of components of the first electronic module, where the first image includes a graphical indication of a location of each of the plurality of components within the first electronic module along with identifying information for each of the plurality of components;
- scaling the first image based upon a first rack unit position of the first electronic module; and
- enabling a display of the scaled first image, such that the graphical indication of the location of each of the plurality of components and the identifying information is aligned with and projected directly onto each of the respective plurality of components located within a housing of the first electronic module while the electronic module is withdrawn from the enclosure.

13. The method of claim 12, wherein identifying the first electronic module includes capturing an image of the first electronic module and performing image processing to extract a mark that identifies the first electronic module.

14. The method of claim 12, wherein identifying the first electronic module is accomplished by:
- measuring a distance between a projection device and the first rack position of the first electronic module in the enclosure, and
- looking up an identity of the first electronic module the first rack position.

15. The method of claim 12, further comprising:
- sending the first set of information to a second processor circuit to enable a rendering of a second image based on the at least some of the components of the first electronic module and a display of the second image on a portable control device display.

16. The method of claim 15, further comprising:
- receiving a request for a second set of information associated with the first electronic module;
- sending the second set of information to the portable control device to enable a rendering of a third image in the portable control device, a scaling of the second image to fit on the portable control device display, and a displaying of the second image on the portable control device display.

* * * * *